No. 770,503. Patented September 20, 1904.

UNITED STATES PATENT OFFICE.

ELI H. LARKIN, OF ST. LOUIS, MISSOURI.

PROCESS OF FORMING COAL BRIQUETS.

SPECIFICATION forming part of Letters Patent No. 770,503, dated September 20, 1904.

Application filed April 30, 1904. Serial No. 205,792. (No model.)

*To all whom it may concern:*

Be it known that I, ELI H. LARKIN, a citizen of the United States, residing in the city of St. Louis, in the State of Missouri, have invented certain new and useful Improvements in Processes of Forming Coal Briquets, of which the following is a full, clear, and exact description.

It is a common thing to add a binder to coal-slack and then mold the mixture into lumps or blocks (called "coal briquets") for use as fuel. Many efforts have been made in this direction, some of which have been failures and some of which have met with some success. A complete success, however, has not, to my knowledge, heretofore been accomplished, owing principally to the fact that the briquets are necessarily subjected to the action of moisture, that results in their partial or total disintegration. Many unsuccessful efforts have been made to prevent this disintegration and many different forms of bonds for holding the particles of slack together have been suggested. Starch made from wheat, corn, rye, or other flour has been suggested, and it has been suggested to make a bond of a mixture of starch, coal-tar, pitch, rosin, and petroleum. Various other forms of bonds have been suggested, but all of such efforts, so far as my experience goes, have been unsuccessful in entirely checking the effect of moisture on the finished article, the result being that when the briquets are subjected to the action of water or damp atmosphere they will disintegrate and return to a powdered form, owing to the fact that the bonds, although containing petroleum and other agents ordinarily supposed to resist the action of moisture, do not prevent the disintegration when they are added to the slack with the bonding agent or agents.

I have discovered by a series of experiments in making coal briquets that if oil is mixed with the coal-slack before the bond is added to the slack the particles of slack become so permeated and coated with the petroleum that when the bond is added and the mixture formed into briquets the product is not subject to the action of moisture, but will remain intact until used.

My invention therefore consists in the process of making coal briquets, which consists in first mixing oil (preferably crude petroleum) with the coal-slack and after this mixture has been thoroughly effected adding thereto a bond (starch paste made of wheat, corn, rye, or other flour being the preferred bond) and then molding the mixture into lumps or blocks to make the article known as "coal briquets."

In carrying out my invention I have found the best results to be obtained by mixing three per cent. of oil with ninety-seven per cent. of coal-slack and then bonding this mixture by the use of starch paste in the proportion of two pounds of starch to one hundred pounds of the oil-treated slack. After the starch paste has been thoroughly mixed with the oil-treated slack the product is pressed into lumps or blocks of the desired size, and it will be found that the briquets thus formed will resist the action of moisture and will not disintegrate.

While I have given what I consider to be the best proportions of the different parts, I do not wish to be strictly limited thereto, as good results can be obtained by departing somewhat therefrom.

I claim as my invention—

The process herein described of making coal briquets, which consists in mixing approximately three per cent. of crude petroleum with about ninety-seven per cent of coal-slack, then adding starch paste in about the proportion of two pounds of starch in paste form to substantially one hundred pounds of the petroleum-treated slack, and finally pressing the mixture into lumps or blocks, substantially as set forth.

ELI H. LARKIN.

In presence of—
  E. S. KNIGHT,
  M. P. SMITH.